(12) United States Patent
Bolser et al.

(10) Patent No.: US 6,461,504 B1
(45) Date of Patent: Oct. 8, 2002

(54) CONTAMINANT FILTER WITH MAGNETIC FILTRATION CAPABILITIES

(75) Inventors: Jerry A. Bolser; Edmond H. Cote, Jr., both of Oak Harbor; Richard J. Berkey, Perrysburg, all of OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/566,750

(22) Filed: May 9, 2000

(51) Int. Cl.⁷ .............................................. B01D 35/06
(52) U.S. Cl. ...................... 210/223; 210/222; 210/695; 210/497.01; 210/493.2; 184/6.25; 156/325; 252/62.51
(58) Field of Search ................. 210/222–223, 210/443, 695, 493.2, DIG. 17, DIG. 13, 497.01; 184/6.24, 6.25; 96/1–3; 156/325–327; 252/62.51

(56) References Cited

U.S. PATENT DOCUMENTS

| | | | | |
|---|---|---|---|---|
| 3,679,057 A | * | 7/1972 | Perez | 210/223 |
| 3,875,061 A | * | 4/1975 | Palma | 210/223 |
| 4,036,616 A | * | 7/1977 | Byrns | |
| 4,038,194 A | * | 7/1977 | Luceyk et al. | |
| 4,176,054 A | * | 11/1979 | Kelley | |
| 4,446,019 A | * | 5/1984 | Robinson | 210/223 |
| 4,961,849 A | * | 10/1990 | Hull et al. | |
| 5,814,211 A | * | 9/1998 | Leo | 210/90 |
| 5,985,435 A | * | 11/1999 | Czaplicki et al. | |

FOREIGN PATENT DOCUMENTS

| | | | |
|---|---|---|---|
| GB | 2091546 A | * | 8/1982 |
| WO | WO-97/22395 | * | 6/1997 |

* cited by examiner

Primary Examiner—Matthew O. Savage
Assistant Examiner—Marianne Ocampo

(57) ABSTRACT

In a fluid filter, magnetic filtration of ferrous particles is provided by an adhesive having magnetic properties which is placed within a filter assembly in either a structural or nonstructural capacity.

10 Claims, 1 Drawing Sheet

CONTAMINANT FILTER WITH MAGNETIC FILTRATION CAPABILITIES

BACKGROUND OF THE INVENTION

1. Technical Field

The present invention relates to fluid filters, and more particularly, to a filter assembly having magnetic filtration capabilities.

2. Discussion

Although magnetic filters and their benefits are well known in the art, magnetic filters have not received widescale commercial acceptance due to one or more disadvantages which are usually found with the prior art designs. Prior art magnetic filters are relatively costly to manufacture when compared to standard filters due primarily to the difficulty in handling and installing the magnets. Additionally, most prior art magnetic filters are less than satisfactory in that their magnets are located downstream from the filter media, thereby eliminating many of the advantages of the magnetic filtration. Thus there remains a need in the art for an effective yet commercially feasible magnetic filter.

SUMMARY OF THE INVENTION

It is therefore an object of the present invention to provide a fluid filter having magnetic filtering capabilities which is commercially feasible to manufacture and relatively inexpensive.

It is yet another object of the present invention to provide a filter assembly with a fluid flow path which subjects the flow of contaminated fluid to a magnetic field prior to encountering a filter media.

The present invention is directed to a filter that overcomes the drawbacks of the prior known devices. The present invention provides a magnetic filter when a securing means is combined with magnetic particles and applied to one or more of the filter components. The securing means can be used in either a structural fashion, securing the filter media to the filter media support for example, or in a nonstructural fashion, as a magnetic film applied to the exposed surface of either the filter housing or the filter media support.

The magnetic properties of the securing means create a magnetic field which envelops a portion of the filter and the surrounding flow of fluid. Preferably, the securing means is applied to an area of the filter that will expose the contaminated fluid to the magnetic field before the contaminated fluid reaches the filter media. In so doing, ferrous particles contained within the contaminated fluid are drawn to and captured by the magnetic field, effectively removing them from the contaminated fluid and thereby preventing these particles from plugging, tearing or otherwise compromising the filtering ability of the filter media.

When the filter is no longer usable and requires replacement, the filter can simply be discarded. Since the replacement filter would already have magnetic properties, proper filtration could be ensured without the need to remove, clean and/or replace magnets.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
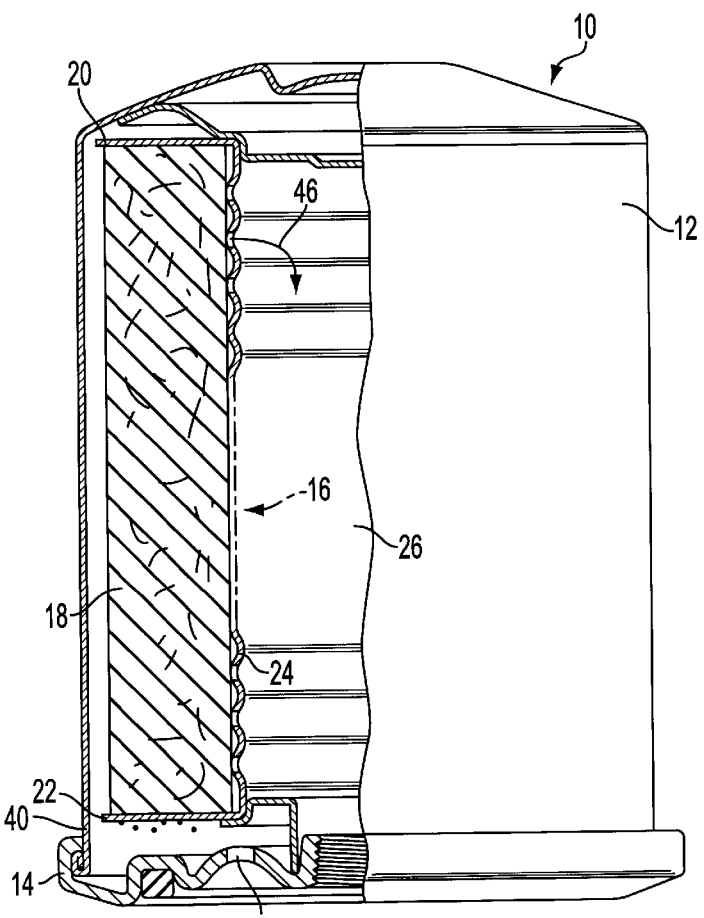
FIG. 1 is a sectional view of an exemplary a spin-on type filter constructed in accordance with the preferred embodiment of the present invention.

Referring to FIG. 1 of the drawings, a "spin-on" type oil filter assembly constructed in accordance with the preferred embodiment of the present invention is generally indicated by reference numeral 10. Filter assembly 10 is cylindrically shaped and is generally comprised of a filter housing 12, a cap 14, and a filter media assembly 16. The filter media assembly 16 is comprised of a filter media 18, upper and lower filter media supports 20 & 22, respectively and a perforated screen 24. Upper and lower filter media supports 20 & 22 are disk-shaped fabrications, extending radially outward toward filter housing 12. Although upper and lower filter media supports 20 & 22 could be constructed from a variety of materials, a ferrous-based material, such as steel, is preferred.

Filter media 18 is cylindrically shaped and contains a hollow interior section 26. Perforated screen 24 supports hollow interior hollow interior section 26 from the pressure differential created by the fluid passing through filter media 18, thereby preventing filter media 18 from being crushed.

Figure 2:
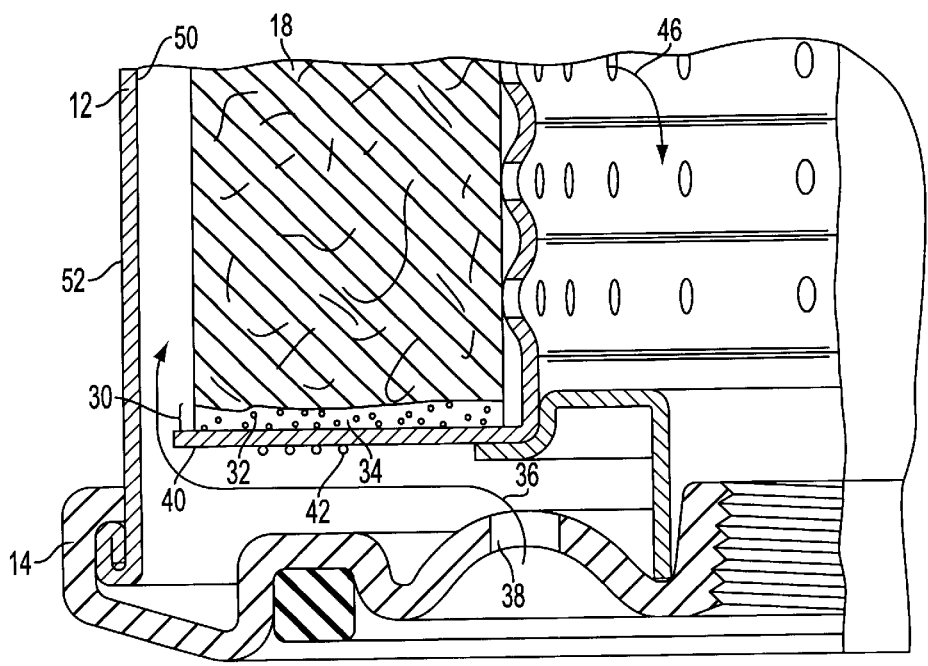
FIG. 2 is an enlarged view of the lower left corner of the filter media assembly shown in FIG. 1.

Referring to FIG. 2, filter media 18 is secured to upper filter media support 20 (not shown) and lower filter media support 22 through the use of a securing means 30, typically an adhesive, having magnetic properties. One method of creating the securing means 30 with magnetic properties would be to incorporate magnetic particles 32 into an adhesive 34. The magnetic field (not shown) produced by securing means 30 envelops the adjacent upper or lower filter media support 20 or 22, as well as the fluid in these vicinities.

Referring back to FIG. 1, contaminated fluid 36 enters the filter through a plurality of apertures 38 spaced circumferentially around the cap 14. Contaminated fluid 36 entering through apertures 38 is directed toward an exposed surface 40 of the lower filter media support 22. As the contaminated fluid 36 flows across exposed surface 40 toward filter housing 12, ferrous particles 42 contained in contaminated fluid 36 are drawn to exposed surface 40 by the magnetic field created by securing means 30, settling onto exposed surface 40 and are thus removed from contaminated fluid 36 prior to reaching filter media 18. The life of filter assembly 10 is thereby extended because ferrous particles 42 are removed before they plug, tear or otherwise damage filter media 18 and compromise the integrity of filter assembly 10.

When contaminated fluid 36 reaches filter housing 12, it is directed inwards toward filter media 18. Fluid passing through filter media 18 in close proximity to upper or lower filter media supports 20 & 22 is subjected to the magnetic field created by securing means 30, thus providing secondary magnetic filtration. Fluid which has passed through filter media 18 and perforated screen 24 enters into the flow of a cleaned fluid 46 from the interior hollow interior section 26 and exits filter assembly 10.

Alternatively, securing means 30 could be used in a nonstructural manner to create the magnetic field needed for magnetic filtration. For example, securing means 30 could be applied on an interior or exterior surface 50 or 52 of filter housing 12 or to an area on exposed surface 40 of upper or lower filter media support 20 or 22. Contaminated fluid 36 passing through the magnetic field created by securing means 30 would draw ferrous particles 42 out of contaminated fluid 36 before it reached filter media 18.

While a specific embodiment of the invention has been shown and described in detail to illustrate the application of the principles of the invention, it will be understood that the invention may be embodied otherwise, without departing from such principles. Accordingly, a filter, which is comprised solely of filter media assembly 16, is within the scope of the present invention.

What is claimed is:

1. A filter assembly for filtering a fluid, said filter assembly comprising:

a filter housing; and a filter media assembly disposed within said housing, wherein said filter media assembly comprises: a filter media; a filter media support; means for securing said filter media to said filter media support; and a magnetic material disposed within said means for securing said filter media to said filter media support for extracting ferrous particles from the fluid.

2. A filter assembly according to claim 1, wherein said filter media support is non-magnetized.

3. A filter assembly according to claim 2, wherein said non-magnetic filter media support constructed from is steel.

4. A filter assembly according to claim 1, wherein said means for securing said filter media to said support is an adhesive comprising said magnetic material.

5. A filter media assembly for filtering a fluid, said filter media assembly comprising:

a filter media;

a filter media support;

means for securing said filter media to said filter media support; and a magnetic material disposed in said means for securing said filter media to said filter media support for extracting ferrous particles from the fluid.

6. A filter media assembly according to claim 5, wherein said filter media support is non-magnetized.

7. A filter media assembly according to claim 6, wherein said non-magnetic filter media support is constructed from steel.

8. A filter media assembly for filtering a fluid, said filter media assembly comprising:

a filter media support;

a filter media secured to said filter media support with an adhesive; and magnetic material disposed within said adhesive for extracting ferrous particles from the fluid.

9. A filter media assembly according to claim 8, wherein said filter media support is non-magnetized.

10. A filter media assembly according to claim 9, wherein said non-magnetic filter media support is constructed from steel.

* * * * *